United States Patent [19]

Woo

[11] Patent Number: 5,752,758

[45] Date of Patent: May 19, 1998

[54] METHOD FOR PRE-COMPENSATING AN ASYMMETRICAL PICTURE IN A PROJECTION SYSTEM FOR DISPLAYING A PICTURE

[75] Inventor: Seong-Jae Woo, Kyeongki-Do, Rep. of Korea

[73] Assignee: Daewoo Electronics Co., Ltd., Seoul, Rep. of Korea

[21] Appl. No.: 747,087

[22] Filed: Nov. 13, 1996

[30] Foreign Application Priority Data

Nov. 13, 1995 [KR] Rep. of Korea ............... 95-40953
Nov. 13, 1995 [KR] Rep. of Korea ............... 95-40954

[51] Int. Cl.$^6$ .............................................. G03B 21/14
[52] U.S. Cl. ......................................... 353/69; 353/70
[58] Field of Search ........................... 353/69, 70, 101, 353/122; 348/745, 746, 747, 806

[56] References Cited

U.S. PATENT DOCUMENTS

| | | | |
|---|---|---|---|
| 4,422,153 | 12/1983 | Arai et al. | 353/70 |
| 5,283,602 | 2/1994 | Kwon | 353/69 |
| 5,355,188 | 10/1994 | Biles et al. | 353/69 |
| 5,548,357 | 8/1996 | Appel et al. | 353/70 |
| 5,557,353 | 9/1996 | Stahl | 353/69 |

FOREIGN PATENT DOCUMENTS 4355740  12/1992  Japan ........................ 353/69

*Primary Examiner*—William Dowling

[57] ABSTRACT

A method in a projector in which in order to project a clear picture onto a screen without the occurrence of the keystoning, an asymmetrical picture is pre-compensated is disclosed. In the method for pre-compensating an asymmetrical picture in a projector, when the projection lens of the projector is arranged at an upward or a downward projection angle, regardless of the projection angle, a trapezoidal error of the picture projected onto the screen is pre-compensated in response to the projection angle setting signal from the projection angle setting section, so the picture is normally projected onto the screen. When pre-compensating the trapezoidal error of an asymmetrical picture, the performance and the structural flexibility of the hardware in the projector is enhanced by using digital circuits and computer software. Therefore, the conventional construction and/or operation of a projector need not be altered.

29 Claims, 11 Drawing Sheets

METHOD FOR PRE-COMPENSATING AN ASYMMETRICAL PICTURE IN A PROJECTION SYSTEM FOR DISPLAYING A PICTURE

BACKGROUND OF THE INVENTION

1. Field of the Invention

The present invention relates to a method for pre-compensating an asymmetrical picture so that in a projection system for displaying a picture, a normal picture is provided regardless of the projection angle of a projection lens with respect to a screen.

2. Description of the Prior Art

Generally, a picture display system for displaying a color picture is divided broadly into direct-view picture display systems, represented by CRTs (Cathode Ray Tubes), and projection systems for displaying a picture (hereinafter, referred to as "projectors"), represented by LCDs (Liquid Crystal Displays). Since CRTs are restricted in their size due to their inherent structure, they cannot provide large-scale color screens. On the other hand, LCDs are able to provide large-scale color screens with slim and light structures, but has a disadvantage of an optical loss.

Therefore, a projector had been widely used. This projector breaks up a color picture signal according to color into RGB light signals, and optically adjusts the RGB signal broken up according to color on the basis of the components of the color signal. The picture signal which is optically adjusted, is magnified via a projection lens and is displayed on a relatively large-scale screen.

FIGS. 1 and 2 are respectively views for showing the arrangement of a projection lens with respect to a screen, and the shape of a picture projected onto the screen in the projector when the picture projected onto the screen is normal. As shown in FIGS. 1 and 2, a center axis 30 is a line connecting a point on a first traverse axis 22, which perpendicularly crosses a first longitudinal axis 21 on a screen 20 at a midpoint point 21A, with a center point 11A of a projection lens 11 of a projector 10. When center axis 30 forms an approximate right angle with respect to the surface of screen 20, a first projection distance 41 which ranges from center point 11A of projection lens 11 to an upper end of the picture, i.e., screen 20, becomes equal to a second projection distance 42 which ranges from center point 11A of projection lens 11 to a lower end of the picture, i.e., screen 20. Also, a third distance 23 which ranges from center axis 30 to the upper end of the picture, i.e., screen 20, becomes equal to a fourth distance 24 which ranges from center axis 30 to the lower end of the picture, i.e., screen 20, so a width 25 of the upper end of the picture becomes approximately equal to a width 26 of the lower end of the picture. As a result, as a whole, the picture is projected in the shape of a rectangle onto screen 20 without keystoning or trapezoidal distortion.

FIGS. 3 and 4 a respectively views for showing an arrangement of the projection lens with respect to the screen, and the shape of the picture projected onto the screen in the projector when the projection lens has an upward projection angle with respect to the screen. As shown in FIGS. 3 and 4, when projection lens 11 of projector 10 is placed below a first plane (not shown) which vertically traverses first longitudinal axis 22 with reference to the surface of screen 20, a center axis 30A has an upward projection angle with reference to the first plane. At this time, a first projection distance 41A is different from a second projection distance 42A, and the picture projected onto screen 20 has the shape of a reverse trapezoid in that a width 25A of the upper end thereof is wider than a width 26A of the lower end thereof.

FIGS. 5 and 6 are respectively views for showing an arrangement of the projection lens with respect to the screen, and the shape of the picture projected onto the screen in the projector when the projection lens has a downward projection angle with respect to the screen. As shown in FIGS. 5 and 6, when projection lens 11 of projector 10 is placed above a first plane (not shown) which vertically traverses first longitudinal axis 22 with reference to the surface of screen 20, a center axis 30A has a downward projection angle with reference to the first plane. At this time, a first projection distance 41B is different from a second projection distance 42B, and the picture projected onto screen 20 has the shape of a trapezoid in that a width 25B of the upper end thereof is smaller than a width 26B of the lower end thereof, contrary to the picture in FIG. 4.

As described above, when the projection lens of the projector is arranged at an upward or downward projection angle with respect to the screen, the magnified picture that is projected onto screen 20 is distorted due to keystoning, i.e., the trapezoidal distortion. In the end, the distorted picture will inevitably irritate a user, so pre-compensation for an asymmetrical or distorted picture that is projected onto the screen due to an occurrence of keystoning, is required.

For example, U.S. Pat. No. 5,355,188 discloses an apparatus and a method for compensating or correcting the trapezoidal error on the screen in the projector. In the disclosed apparatus and method, the trapezoidal error is eliminated by maintaining an optical center of a field lens on the optical axis of the projection lens.

As another example, U.S. Pat. No. 5,283,602 discloses an apparatus for compensating the trapezoidal error on the screen in the projector. In the disclosed apparatus, an optical path diversifying mirror is arranged at an inlined angle of 45 degrees, with respect to an optical path of a light, and is also arranged so that it can be moved in a direction parallel to the optical path toward or away from a projected object, thereby the image is projected upwardly or downwardly without the occurrence of the trapezoidal distortion on the screen.

However, in order to solve the trapezoidal distortion on the screen, the aforementioned configuration take an optical or a mechanical approach, so their performance and their structural flexibility are restricted.

SUMMARY OF THE INVENTION

Therefore, it is an object of the present invention to provide a method for pre-compensating an asymmetrical picture in which the trapezoidal error, i.e., the trapezoidal distortion, of the asymmetrical picture projected onto the screen, is pre-compensated by using computer software in response to a projection angle setting signal, i.e., key data, provided by a projecting angle setting section regardless of the arrangement of a projection lens with respect to the screen in a projection system for displaying a picture.

In order to achieve the above object, the present invention provides a method for pre-compensating an asymmetrical picture in a projection system for displaying a picture, which comprises the steps of:

(i) inputting a key data corresponding to a projection angle setting signal when a central axis of a projection lens installed in a projector for projecting a magnified picture onto a screen is arranged at an upward or downward projection angle with respect to the screen;

(ii) calculating on the basis of the key data inputted in step (i) parameters including a compensation direction, compensation amount(s) and a number of pixels to be deleted which are related to an operation for pre-compensating an asymmetry of a picture which is to be projected onto the screen;

(iii) generating a switched write clock signal having a pixel deletion time interval, at a leading edge of a main clock signal in accordance with the number of pixels to be deleted, calculated in step (ii);

(iv) recording a picture signal data with pixels deleted therefrom in units of a scanning line in the compensation direction determined in step (ii), in response to the switched write clock signal generated in step (iii) in order to generate a picture shaped in reverse to the picture to be projected onto the screen;

(v) generating a switched data conversion output signal at a leading edge of the main clock signal in order to have a time delay based on one of the parameters calculated in step (ii);

(vi) adding blanking data in the compensation direction determined in step (ii) to pixel-deleted parts of the read picture signal data in response to a second switching control signal in order to form picture signal data compensated in units of a scanning line; and (vii) converting the picture signal data having the blanking data added thereto and being formed in step (vi), into an analog signal in response to the switched data conversion output signal generated in step (v), and outputting a converted picture signal data.

In the method for pre-compensating an asymmetrical picture in a projection system for displaying a picture, when the projection lens of the projector is arranged in an upward or a downward projection angle, regardless of the projection angle, the trapezoidal error of the picture projection onto the screen is pre-compensated in response to the projection angle setting signal from the projection angle setting section. Since the trapezoidal error is solved by using digital circuits and computer software, the performance and the structural flexibility of the hardware of the projector are enhanced.

BRIEF DESCRIPTION OF THE DRAWINGS

The above objects and other advantages of the present invention will become more apparent by describing in detail preferred embodiment thereof with reference to the attached views, in which.

DESCRIPTION OF THE PREFERRED EMBODIMENTS

A description will be given below in detail with reference to the accompanying views to the configuration and the operation of a method for pre-compensating an asymmetrical picture in a projection system for displaying a picture according to an embodiment of the present invention.

Figure 7:
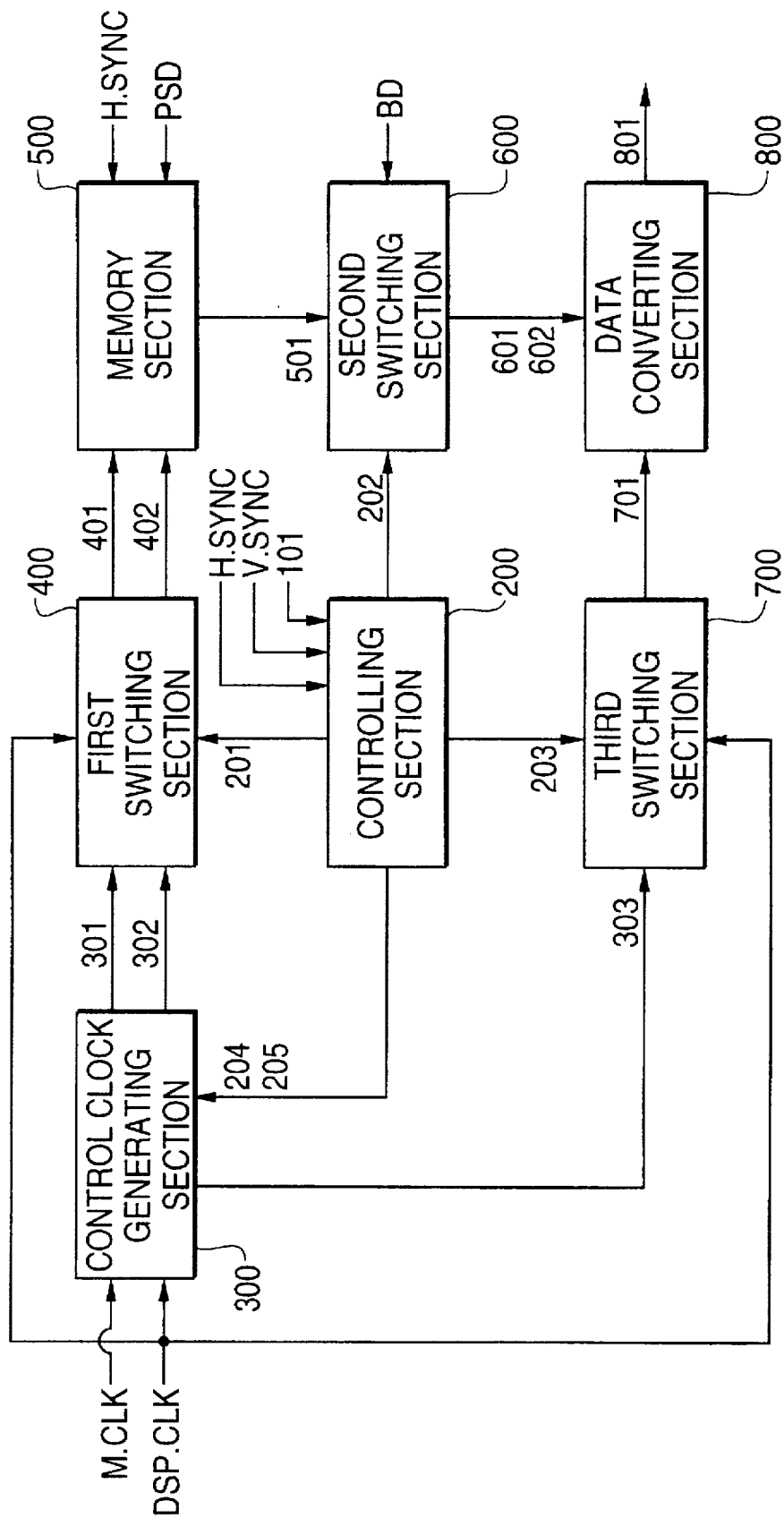
FIG. 7 is a circuit block diagram for showing an apparatus for pre-compensating an asymmetrical picture in a projector, which can perform methods according to embodiments of the present invention.

FIG. 7 is a circuit block diagram for showing an apparatus for pre-compensating an asymmetrical picture in a projector, which can perform methods according to embodiments of the present invention. As shown in FIG. 7, an apparatus for pre-compensating an asymmetrical picture in a projection system for displaying a picture according to the present invention, comprises a projection angle setting section 100, a controlling section 200, a control clock generating section 300, a first switching section 400, a memory section 500, a second switching section 600, a third switching section 700, and a data converting section 800.

Projection angle setting section 100 provides a projection angle setting signal 101 when a center axis 11A of a projection lens 11 installed in a projector 10 for projecting a magnified picture onto a screen 20 is arranged at an upward or downward projection angle with respect to screen 20.

Controlling section 200 provides a control signal in order to control an operation of pre-compensating an asymmetry of the picture which will be projected on screen 20 on the basis of projection angle setting signal 101 of projection angle setting section 100.

Control clock generating section 300 providing a write clock signal 301, a read clock signal 302, and a data conversion output signal 303 in accordance with the control signal from controlling section 200, while receiving a main clock signal M.CLK and a digital signal process clock signal DSP.CLK. Write clock signal 301 relates to a process for deleting pixels of a picture signal data PSD.

First switching section 400 switches write clock signal 301 and read clock signal 302 from control clock generating section 300 and provides a switched write clock signal 401 or a switched read clock signal 402 in accordance with the control signal from controlling section 200, while receiving digital signal process clock signal DSP.CLK. Switched write clock signal 401 relates to the process for deleting pixels of picture signal data PSD.

Memory section 500 records picture signal data PSD, which has pixels deleted therefrom and is provided in response to a horizontal synchronizing signal H.SYNC, and outputs the recorded picture signal data while receiving switched write clock signal 401 or switched read clock signal 402 from first switching section 400.

Second switching section 600 switches in accordance with the control signal from controlling section 200 between picture signal data PSD outputted from memory section 500 in response to switched read clock signal 402 from first switching section 400, and blanking data BD (see FIGS. 14 and 15) which is filled in blanking areas set prior to and after picture signal data PSD having pixels deleted therefrom, and second switching section 600 provides a switched picture signal data 601 or a switched blanking data 602.

Third switching section 700 switches data conversion output signal 303 from control clock generating section 300 and provides a switched data conversion output signal 701 in accordance with a third switching control signal 203 from controlling section 200 while receiving digital signal process clock signal DSP.CLK.

Data converting section 800 inputs switched picture signal data 601 or switched blanking data 602 from second switching section 600 in order to form picture signal data PSD having blanking data BD added thereto, and converts picture signal data PSD having blanking data BD added thereto into an analog signal, after a predetermined time delay, in response to switched data conversion output signal 701 from third switching section 700, in order to provide a converted picture signal data 801.

Controlling section 200 applies to control clock generating section 300 write control signal 301 and readout control signal 302 in order to control the process for pre-compensating the asymmetry of the picture which will be projected onto screen 20, in response to projection angle setting signal 101 from projection angle setting section 100, a vertical synchronizing signal V.SYNC, and horizontal synchronizing signal H.SYNC of the picture signal when projection lens 11 is arranged at an upward or downward projection angle with respect to screen 20. Namely, controlling section 200 calculates a compensation amount in units of a scanning line of the picture, determines a compensation direction of the picture in the pre-compensating process, and controls the generation of write clock 301 from the control clock generating section 300.

Controlling section 200 applies to second switching section 600 second switching control signal 202 for adding blanking data BD (see FIGS. 14 and 15) to parts of the picture signal, in which pixels are deleted in units of a scanning line on the basis of the compensation amount in units of a scanning line.

Controlling section 200 adjusts the waveform of the write clock signal from control clock generating section 300 and controls the process in which pixels of the picture signal data are deleted in units of a scanning line in accordance with the compensation amount and the compensation direction, while recording the picture signal data in memory section 500.

Also, controlling section 200 controls first switching section 400 in order to read out the picture signal data in units of a scanning line while the recorded picture signal data is being read out from memory section 500 in response to read clock signal 302 from control clock generating section 300. Controlling section 200 adjusts the generation of second switching control signal 202 therefrom in order to add blanking data BD in the compensation direction prior to and after picture signal data PSD by the switching operation of second switching section 600, while reading out the picture signal data recorded in units of a scanning line. The control signal from controlling section 200 includes first switching control signal 201, second switching control signal 202, third switching control signal 203, and record control signal 204 and readout control signal 205.

Figure 14:
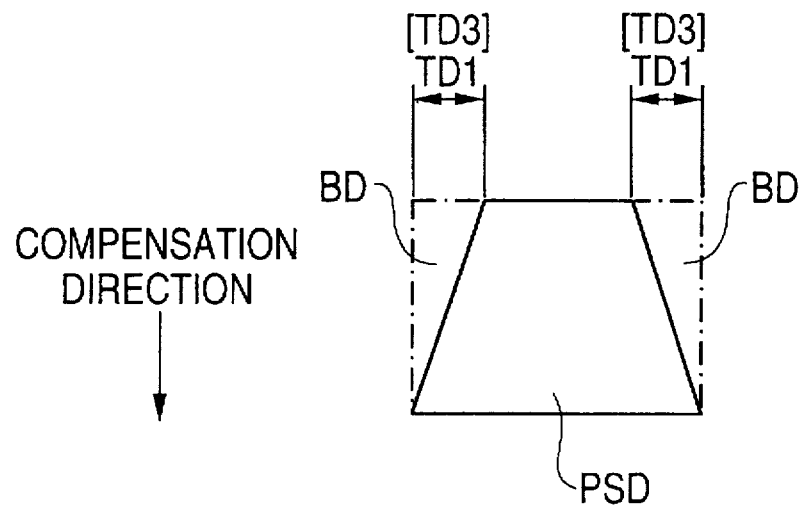
FIG. 14 is a view for illustrating a pre-compensated picture signal when the projection lens is arranged as shown in FIG. 3.
Figure 15:
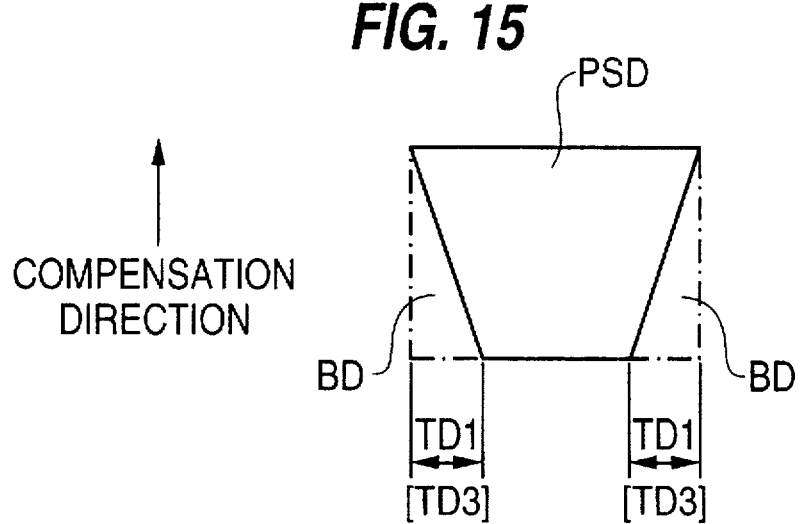
FIG. 15 is a view for illustrating a pre-compensated picture signal when the projection lens is arranged as shown in FIG. 5.

Control clock generating section 300 provides write clock signal 301 for controlling the recording in memory section 500 picture signal data PSD having pixels deleted therefrom (see FIGS. 14 and 15) in units of a scanning line in accordance with the compensation amount and the compensation direction (see FIGS. 14 and 15). Control clock generating section 300 also provides read clock signal 302 for reading out the picture signal data recorded in response to write clock signal 301, and provides data conversion output signal 303 for determining the time when the pre-compensated picture signal data is converted into the analog signal by data converting section 800. Read clock signal 302 has the frequency of a normal clock. Data conversion output signal 303 has a predetermined time delay beginning from a point in time of a leading edge of the normal horizontal digital signal process clock signal.

Memory section 500 has the picture signal data PSD having pixels deleted in units of a scanning line in accordance with the compensation amount and the compensation direction (see FIGS. 14 and 15) in response to switched write clock signal 401 from first switching section 400, and has the recorded picture signal data outputted therefrom after the blanking period in response to switched read clock signal 402 from first switching section 400. Memory section 500 has the picture signal data recorded therein in units of a scanning line in the system of first-in-first-out.

Figure 9:
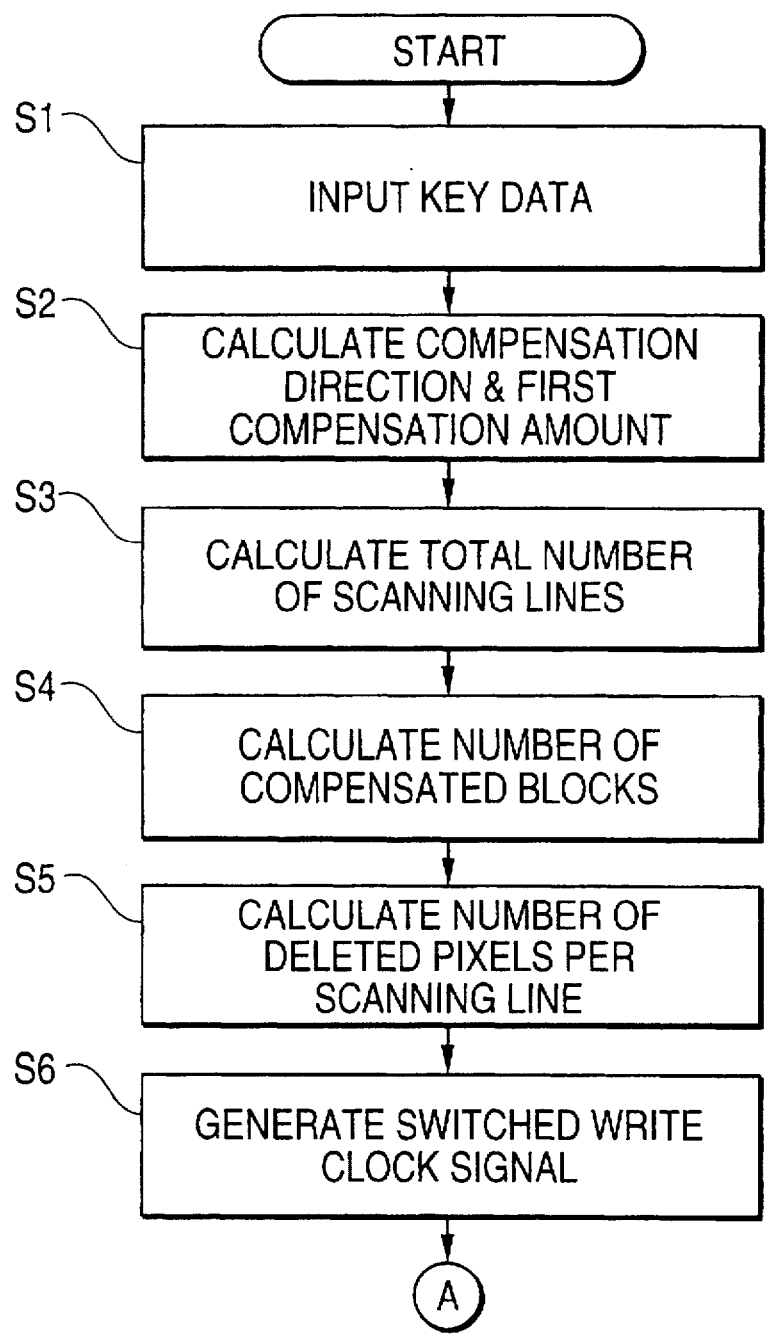
FIGS. 9 and 10 are a flowchart for illustrating the method according to one embodiment of the present invention for pre-compensating an asymmetrical picture, which is performed by the apparatus for pre-compensating an asymmetrical picture shown in FIG. 7.
Figure 10:
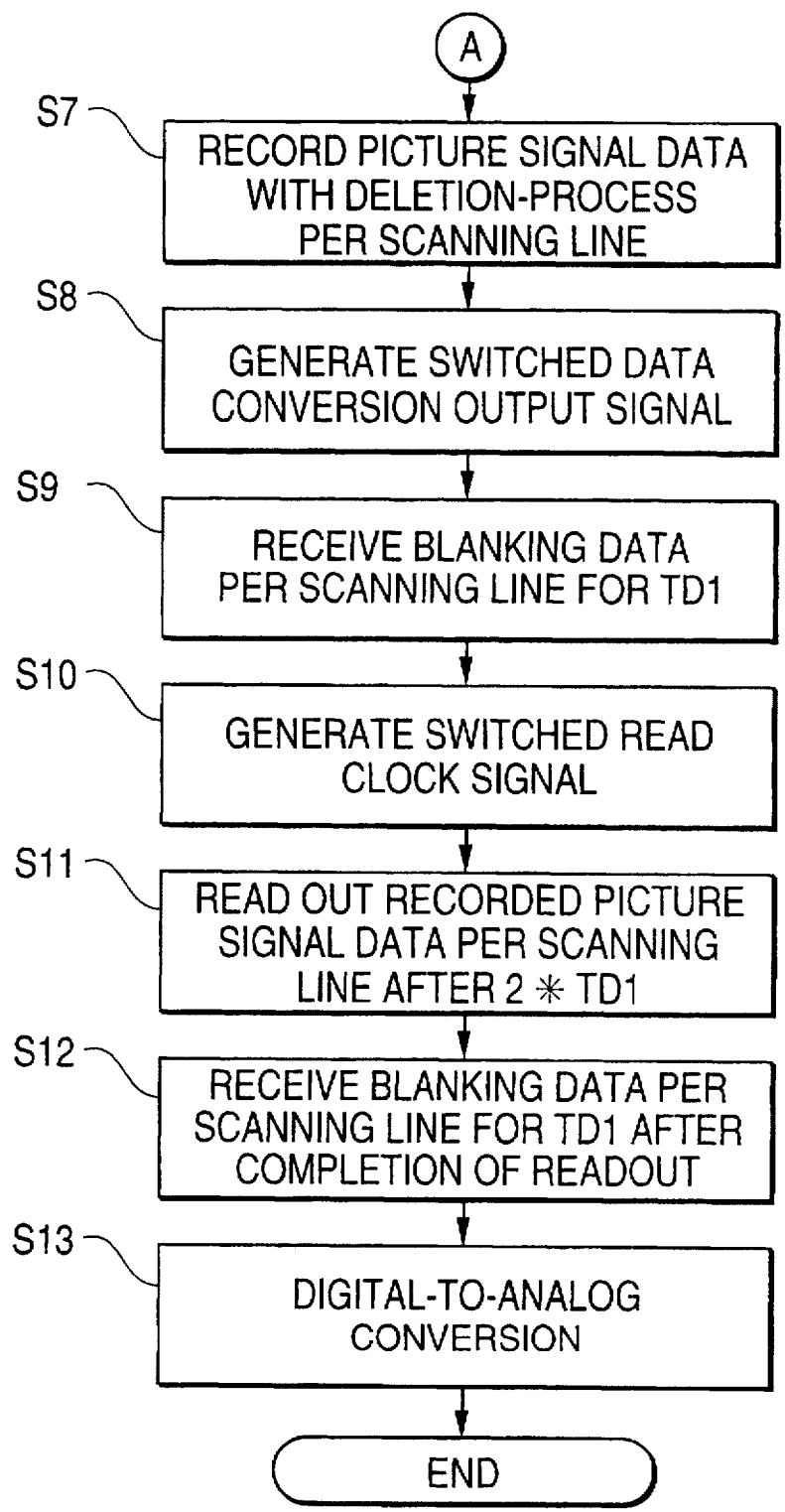

A description will next be made on embodiments of the method for pre-compensating an asymmetrical picture using the apparatus shown in FIG. 7, in accordance with the flowchart of FIGS. 9 and 10, while referring to the timing diagram of FIG. 8.

EMBODIMENT 1

Figure 8:
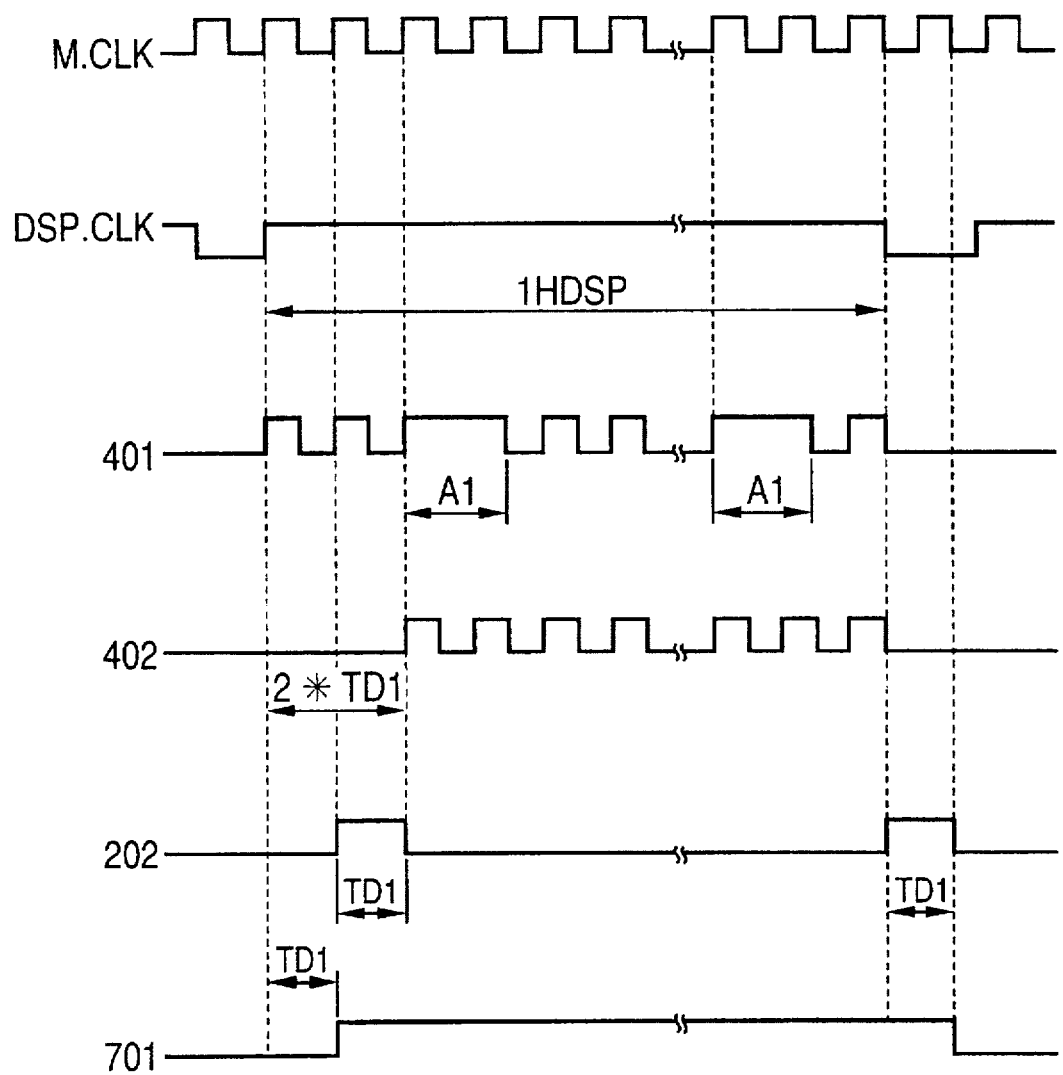
FIG. 8 is a timing diagram for illustrating the operation of the apparatus for pre-compensating an asymmetrical picture shown in FIG. 7 while performing the method according to one embodiment of the present invention.

FIG. 8 is a timing diagram for illustrating the operation of the apparatus for pre-compensating an asymmetrical picture shown in FIG. 7 while performing the method according to one embodiment of the present invention. FIGS. 9 and 10 are a flowchart for illustrating the method according to one embodiment of the present invention for pre-compensating an asymmetrical picture, which is performed by the apparatus for pre-compensating an asymmetrical picture shown in FIG. 7. In FIG. 8, 1HDSP and A1 respectively denote a horizontal scanning time interval and the pixel deletion time interval of the picture signal data. Also, TD1 denotes a time interval corresponding to one half of a first compensation amount.

Figure 3:
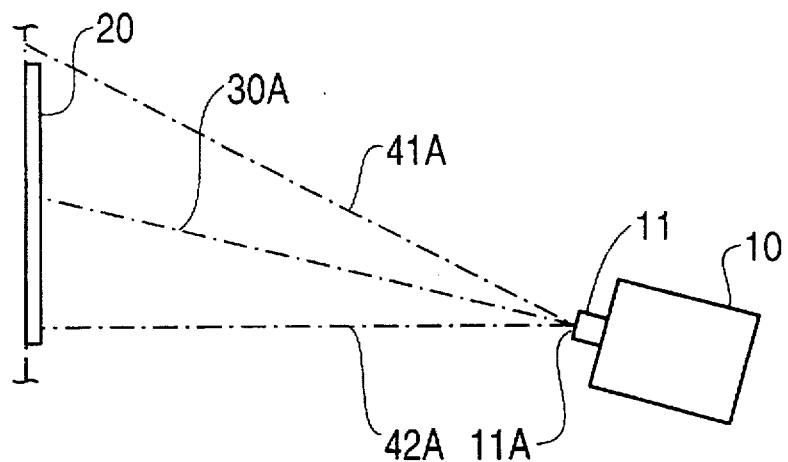
FIGS. 3 and 4 are respectively views for showing an arrangement of the projection lens with respect to the screen, and the shape of the picture projected onto the screen in the projector when the projection lens has an upward projection angle with respect to the screen.
Figure 5:
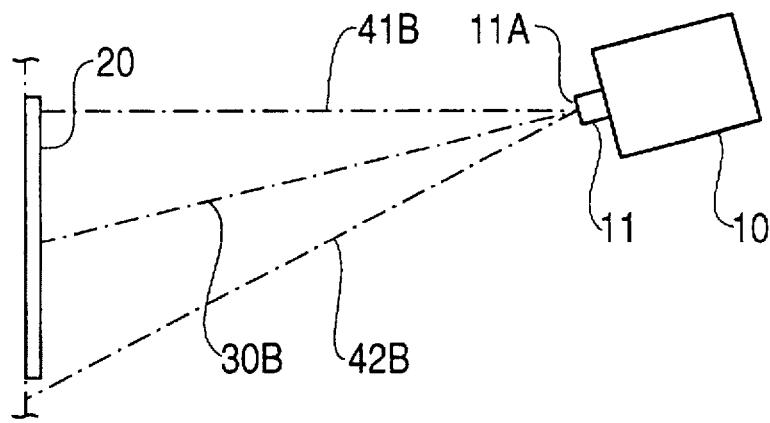
FIGS. 5 and 6 are respectively views for showing an arrangement of the projection lens with respectively to the screen, and the shape of the picture projected onto the screen in the projector when the projection lens has a downward projection angle with respect to the screen.

First, in step S1, controlling section 200 inputs a key data corresponding to projection angle setting signal 10 when a central axis of projection lens 11 installed in projector 10 for projecting a magnified picture onto screen 20 is arranged at an upward or downward projection angle with respect to screen 20 (see FIG. 3 or FIG. 5). In step S2, controlling section 200 determines a compensation direction and calculates a first compensation amount of the basis of the key data inputted in step S1. In step S3, controlling section 200 calculates a total number of scanning lines of the picture. In step S4, controlling section 200 calculates a number of compensated blocks on the basis of the first compensation amount and the total number of scanning lines respectively calculated in steps S2 and S3. In step S5, controlling section 200 calculates a number of pixels to be deleted in units of a scanning line on the basis of the total number of scanning lines and on the basis of the number of compensated blocks which are respectively calculated in steps S3 and S4. Namely, in steps S2 to S5, controlling section 200 calculates on the basis of the key data inputted in step S1 parameters related to an operation for pre-compensating an asymmetry of a picture which is to be projected onto screen 20. Here, the compensation direction is an upward direction or a downward direction. When the first compensation amount and the total number of scanning lines of the picture are respectively referred to as CA and NS, a number of compensated blocks NB is expressed as in an equation 1.

$$NB=(2\times NS)/CA \rightarrow \text{equation 1}$$

Here, when NS and CA are respectively 480 and 20, number of compensated blocks NB is 48 with the equation 1. Thus, e.g., 2 pixels are deleted at the scanning lines 480 to (480−48), and 4 pixels are deleted at the scanning lines (480−48) to (480−48×2). In this manner, 2 pixels are additionally deleted in units of 48 scanning lines.

In step S6, switched write clock signal 401 having a pixel deletion time interval of A1 is generated at a leading edge of main clock signal M.CLK in accordance with the number of pixels to be deleted, calculated in step S5, by first switching section 400 which inputs write clock signal 300 from control clock generating section 300. In step S7, picture signal data PSD with pixels deleted therefrom in units of a scanning line is recorded in memory section 500 in a compensation direction determined in step S2 in response to switched write clock signal 401 generated in step S6, in order to generate a picture shaped in reverse to the picture which is to be projected onto screen 20. In step S8, switched data conversion output signal 701 is generated at a leading edge of main clock signal M.CLK by third switching section 700, which inputs data conversion output signal 303 from control clock generating section 300, in order to have a time delay TD1 corresponding to one half of the first compensation amount calculated in step S2 and begging from a point in time of a leading edge of horizontal digital signal process clock signal DSP.CLK.

In step S9, data converting section 800 receives blanking data BD in units of a scanning line by the switching operation of second switching section 600 for time interval TD1 corresponding to one half of the first compensation amount prior to the time when picture signal data PSD having pixels deleted therefrom in units of a scanning line is read out. In step S10, switched read clock signal 402 for reading out picture signal data PSD recorded in step S7 is generated at a leading edge of main clock signal M.CLK by first switching section 400, which inputs read clock signal 302 from control clock generating section 300 in order to have a time delay 2*TD1 corresponding to the first compensation amount calculated in step S2. Switched read clock signal 402 has time delay 2*TD1 corresponding to the first compensation amount and beginning from a point in time of a leading edge of horizontal digital signal process clock signal DSP.CLK. In step S11, recorded picture signal data PSD is read out in units of a scanning line in response to switched read clock signal 402 generated in step S10. In step S12, data converting section 800 receives blanking data BD by the switching operation of second switching section 600 for time interval TD1 corresponding to one half of the first compensation amount and beginning from a point in time when in step S11, reading out the recorded picture signal data PSD in units of a scanning line ends. Namely, in steps S9 to S12, blanking data 602 is added in the compensation direction to pixel-deleted parts of the read picture signal data 601 in response to a high-level pulse portion having time interval TD1 corresponding to one half of the first compensation amount, of second switching control signal 202, in order to form the compensated picture signal data having a time delay corresponding to one half of the first compensation amount in units of a scanning line.

In step S13, switched picture signal data 601 having switched blanking data 602 added thereto and being generated in steps S8 to S10, is converted in response to switched data conversion output signal 701 generated in step S8 (see FIG. 8) into an analog signal, and converted picture signal data 801 is generated. Converted picture signal data 801 is provided to projector 10.

EMBODIMENT 2

Figure 11:
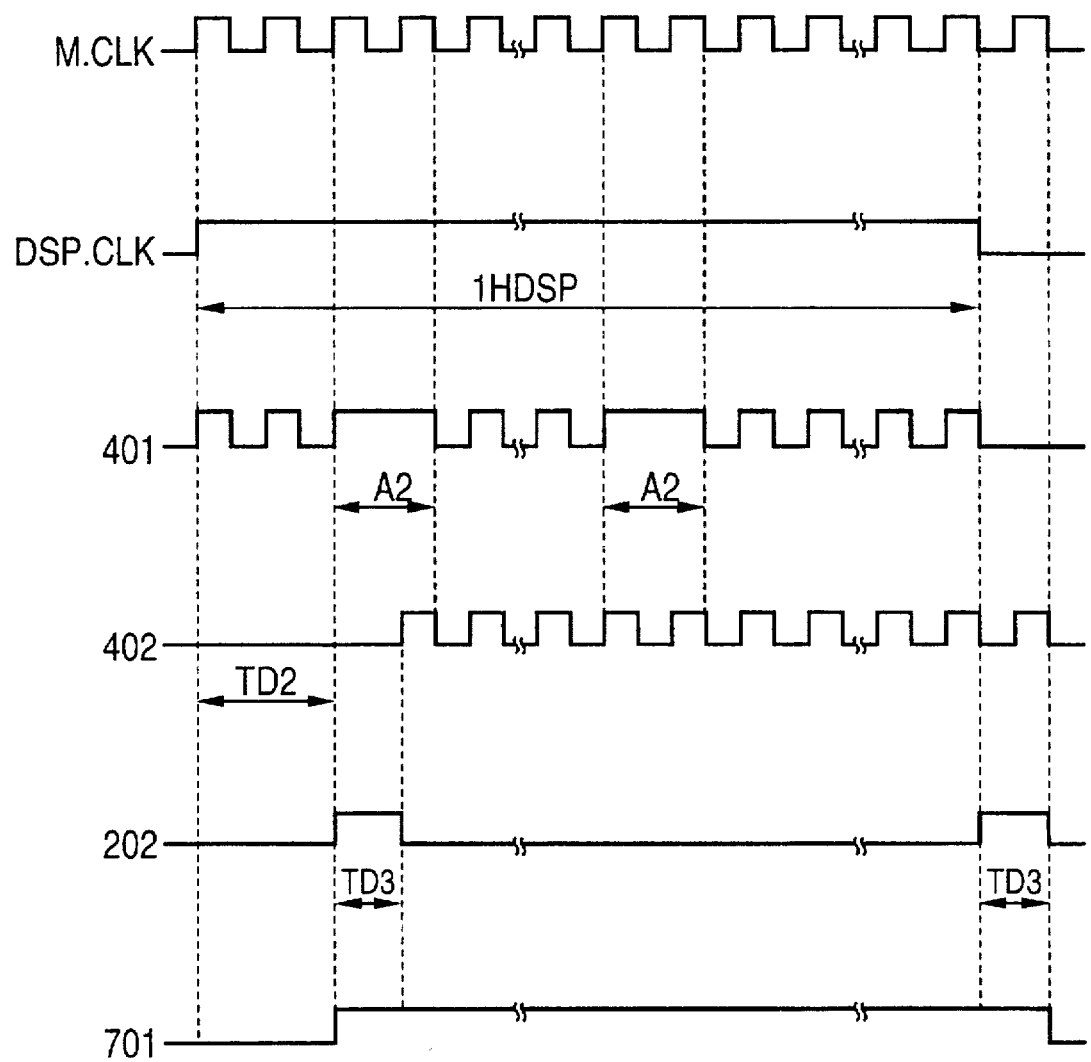
FIG. 11 is a timing diagram for illustrating the operation of the apparatus for pre-compensating an asymmetrical picture shown in FIG. 7 while performing a method according to another embodiment of the present invention.
Figure 12:
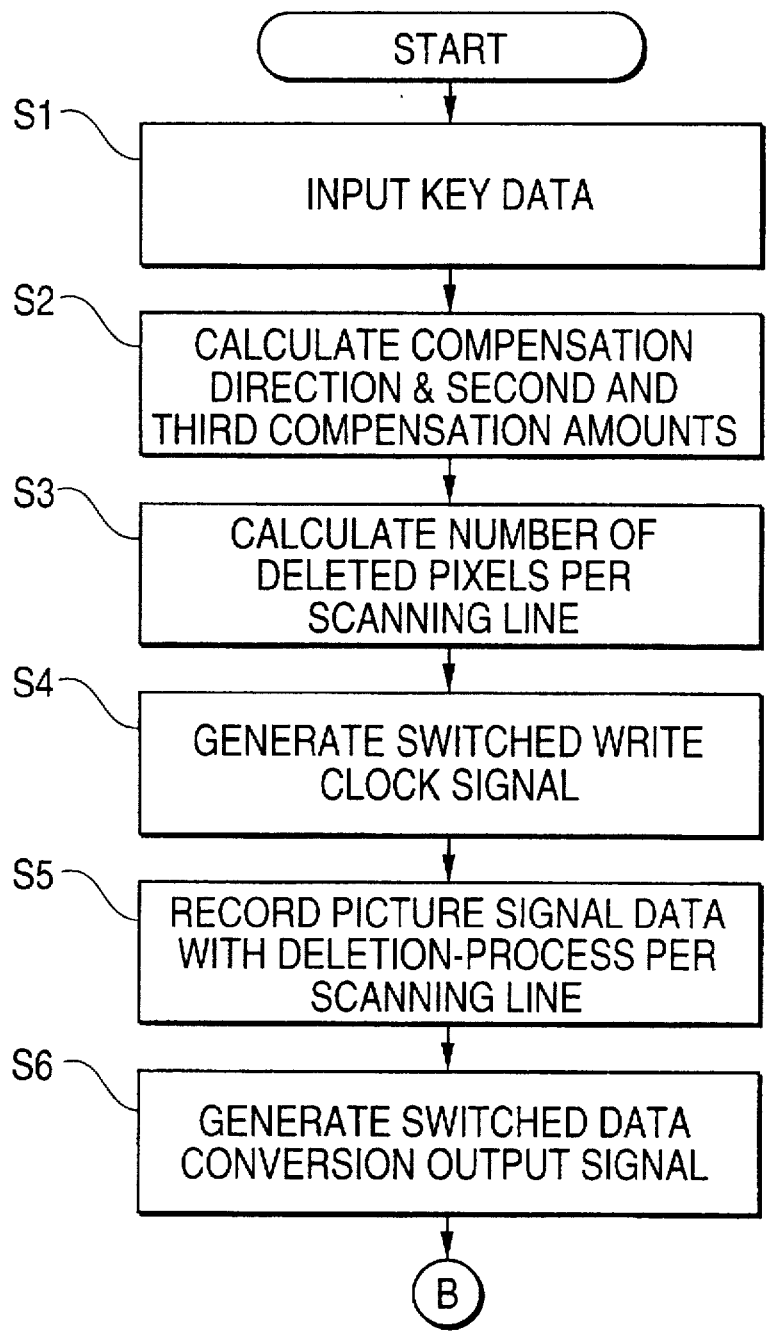
FIGS. 12 and 13 are a flowchart for illustrating the method according to another embodiment of the present invention for pre-compensating an asymmetrical picture, which is performed by the apparatus for pre-compensating an asymmetrical picture shown in FIG. 7.
Figure 13:
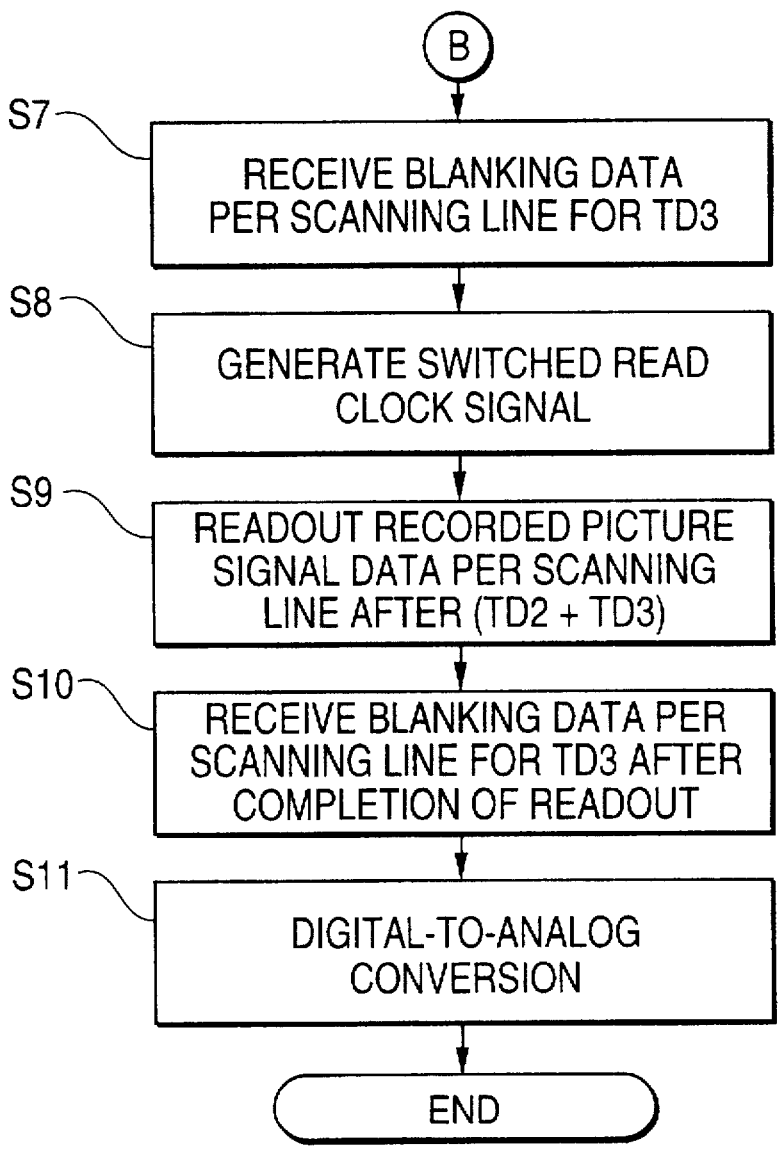

FIG. 11 is a timing diagram for illustrating the operation of the apparatus for pre-compensating an asymmetrical picture shown in FIG. 7 while performing a method according to another embodiment of the present invention. FIGS. 12 and 13 are a flowchart for illustrating the method according to another embodiment of the present invention for pre-compensating an asymmetrical picture, which is performed by the apparatus for pre-compensating an asymmetrical picture shown in FIG. 7. In FIG. 11, 1HDSP and A2 respectively denote a horizontal scanning time interval and the pixel deletion time interval of the picture signal data. Also, TD2 and TD3 respectively denote a time interval corresponding to one half of a second compensation amount and a time interval corresponding to one half of a third compensation amount.

First, in step S1, controlling section 200 inputs a key data corresponding to projection angle setting signal 10 when a central axis of projection lens 11 installed in projector 10 for projecting a magnified picture on screen 20 is arranged at an upward or downward projection angle with respect to screen 20 (see FIG. 3 or FIG. 5). In step S2, controlling section 200 determines a compensation direction and calculates a second and third compensation amounts on the basis of the key data inputted in step S1. In step S3, controlling section 200 calculates a number of pixels to be deleted in units of a scanning line on the basis of the third compensation amount calculated in step S2. Namely, in steps S2 and S3, controlling section 200 calculates on the basis of the key data inputted in step S1 parameters related to an operation for pre-compensating an asymmetry of a picture which is to be projected onto screen 20. Here, the compensation direction is an upward direction or a downward direction. The second and third compensation amounts respectively denote a maximum compensation amount and a compensation amount in units of a compensated block.

In step S4, switched write clock signal 401 having a pixel deletion time interval of A2 is generated at a leading edge of main clock signal M.CLK in accordance with the number of pixels to be deleted, which was calculated in step S3, by first switching section 400, which inputs write clock signal 301 from control clock generating section 300. In step S5, picture signal data PSD with pixels deleted therefrom in units of a scanning line is recorded in memory section 500 in the compensation direction determined in step S2 in response to switched write clock signal 401 generated in step S4 in order to generate a picture shaped in reverse to the picture which is to be projected onto screen 20. In step S6, switched data conversion output signal 701 is generated at a leading edge of main clock signal M.CLK by third switching section 700, which inputs data conversion output signal 303 from control clock generating section 300 in order to have time delay TD2 corresponding to one-half of the second compensation amount calculated in step S2 and beginning from a point in time of a leading edge of horizontal digital signal process clock signal DSP.CLK.

In step S7, data converting section 800 receives blanking data BD in units of a scanning line by the switching operation of second switching section 600 for time interval TD3 corresponding to one half of the third compensation amount, prior to the time when picture signal data PSD having pixels deleted therefrom in units of a scanning line is read out. In step S8, switched read clock signal 402 for reading out picture signal data PSD recorded in step S5 is generated at a leading edge of main clock signal M.CLK by first switching section 400, which inputs read clock signal 302 from control clock generating section 300, in order to have the time delay of (TD2+TD3) corresponding to one half of the sum of the second and third compensation amounts calculated in step S2. Switched read clock signal 402 has the time delay of (TD2+TD3) corresponding to one half of the sum of the second and third compensation amounts and beginning from a point in time of a leading edge of horizontal digital process clock signal DSP.CLK. In step S9, recorded picture signal data PSD is read out in units of a scanning line in response to switched read clock signal 402 generated in step S8. In step S10, data converting section 800 receives blanking data BD by the switching operation of second switching section 600 for time interval TD3 corresponding to one half of the third compensation amount and beginning from a point in time when in step S9, reading out recorded picture signal data PSD in units of a scanning line has finished. Namely, in steps S7 to S10, blanking data 602 is added in the compensation direction to pixel-deleted parts of the read picture signal data 601 in response to a high-level pulse portion having time interval TD3 corresponding to one half of the third compensation amount, of second switching control signal 202, in order to form the compensated picture signal data having time delay TD2 corresponding to one half of the second compensation amount in units of a scanning line.

In step S11, switched picture signal data 601 having switched blanking data 602 added thereto and being generated in steps S7 to S10, is converted in response to switched data conversion output signal 701 generated in step S6 (see FIG. 11), into an analog signal, and converted picture signal data 801 is generated. Converted picture signal data 801 is provided to projector 10.

Hereinafter, a description of the operation of the apparatus which is used in the method for pre-compensating an asymmetrical pictures in a projection system for displaying a picture according to embodiments of the present invention which have the aforementioned configuration, will be provided as follows.

Figure 1:
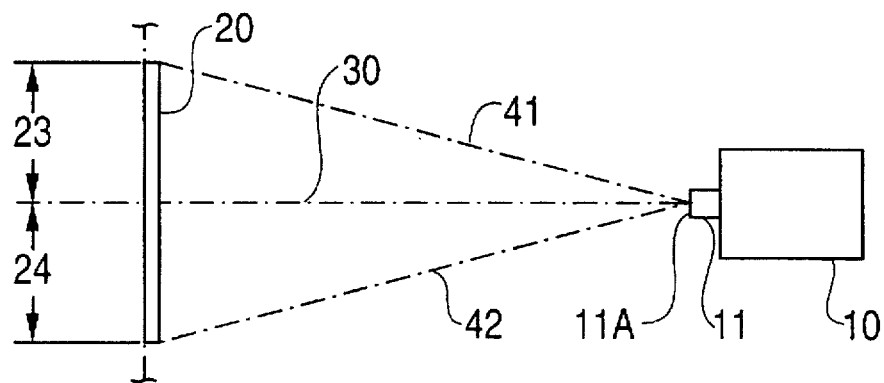
FIGS. 1 and 2 are respectively views for showing the arrangement of a projection lens with respect to a screen, and the shape of a picture projected onto the screen in the projector when the picture projected onto the screen is normal.
Figure 2:
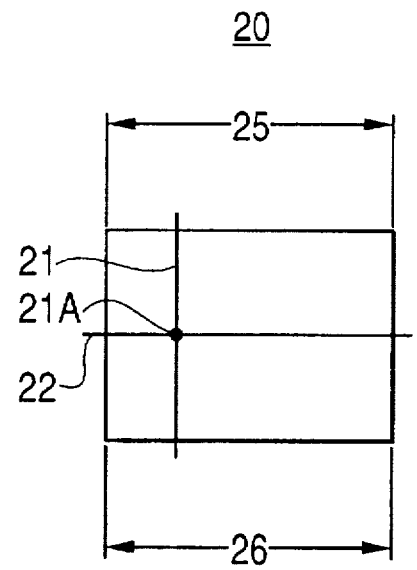
Figure 4:
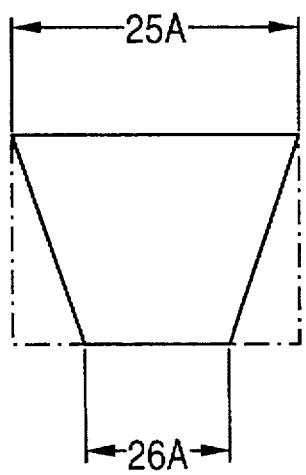

FIG. 14 is a view for illustrating a pre-compensated picture signal when the projection lens is arranged as shown in FIG. 3. Hereinafter, a description concerning Embodiment 1 will be provided with reference to a timing diagram to FIG. 8, and a description concerning Embodiment 2 will be given with reference to another timing diagram in FIG. 11. As shown in FIG. 3, when projection lens 11 of projector 10 is arranged at an upward projection angle with respect to screen 20, projection angle setting signal 101 from projection angle setting section 100 is applied to controlling section 200. In response to projection angle setting signal 101, controlling section 200 controls the process for pre-compensating picture signal data PSD in order to project a normal picture (see FIG. 2) onto screen 20. As shown in FIG. 4, the picture projected onto screen 20 has the shape of a reverse trapezoid in which width 25A of the upper end is greater than width 26A of the lower end. Therefore, controlling section 200 controls the process for pre-compensating picture signal data PSD in order to form, in the shape of a trapezoid, the picture which is to be projected onto screen 20 (see FIG. 14). Namely, controlling section 200 applies record control signal 204 to control clock generating section 300 so that in response to main clock signal M.CLK, control clock generating section 300 can output write clock signal 301, whose frequency is adjusted in the compensation direction for the upward projection angle (the direction of the arrow shown in FIG. 10).

In response to record control signal 204, control clock generating section 300 outputs write clock signal 301 for executing the process in which the pixels of picture signal data PSD are deleted in the compensation direction when picture signal data PSD is provided in units of a scanning line to memory section 500 in response to horizontal synchronizing signal H.SYNC. Namely, at a leading edge of main clock signal M.CLK, control clock generating section 300 outputs write clock signal 301 for recording picture signal data PSD. When first switching control signal 201 from controlling section 200 is applied to first switching section 400, write clock signal 301 is applied to memory section 500 via first switching section 400.

In response to switched write clock signal 401 from first switching section 400, memory section 500 records deletion-processed picture signal data PSD while deleting the pixels of picture signal data PSD in units of a scanning line, in order to produce a picture having a shape reverse to the shape of the picture which is to be projected onto screen 20 (see FIG. 4). When a normal frequency of read clock signal 302 generated at a leading edge of main clock signal M.CLK is applied to memory section 500 with a predetermined time delay, i.e., 2*TD1 in Embodiment 1 or (TD2+TD3) in Embodiment 2, under the control operation of controlling section 200, picture signal data PSD recorded in memory section 500 is read out with a predetermined time delay, i.e., 2*TD1 in Embodiment 1 or (TD2+TD3) in Embodiment 2. Controlling section 200 applies second switching control signal 202 to second switching section 600. Then, blanking data BD supplied from outside to second switching section 600 for a predetermined time interval, i.e., TD1 in Embodiment 1 or TD3 in Embodiment 2, is outputted from second switching section 600 in order to generate a pre-compensated picture (see FIG. 14). Also, control section 200 controls memory section 500 to output read picture signal data 501 for a duration of an effective picture signal. When the duration of an effective picture signal is completed, controlling section 200 controls second switching section 600, and the switching operation of second switching section 600 provides blanking data BD for a predetermined time interval, i.e., TD1 in Embodiment 1 or TD3 in Embodiment 2.

Thus, both switched picture signal data 601 and switched blanking data 602 are provided from second switching section 600 to data converting section 800. When controlling section 200 applies third switching control signal 203 to third switching section 700, data conversion output signal 303, which has a predetermined time interval, i.e., TD1 in Embodiment 1 or TD2 in Embodiment 2, is supplied from control clock generating section 300 to data converting section 800 via third switching section 700. Then, data converting section 800 converts switched picture signal data 601, which has switched blanking data 602 added therein, i.e., picture signal data PSD which has blanking data BD added therein, and data converting section 800 applies converted picture signal data 801, i.e., a pre-compensated picture signal, to projector 10. Consequently, even when projection lens 11 of projector 10 is arranged at an upward projection angle with respect to screen 20 (see FIG. 3), a pre-compensated picture signal (see FIG. 14) is projected onto screen 20 via projection lens 11, so a normal picture (see FIG. 2) is formed on screen 20. Namely, in contrast to the asymmetrical picture (see FIG. 4) which occurs when picture signal data PSD is not pre-compensated, a normal picture is projected onto screen 20.

Figure 6:
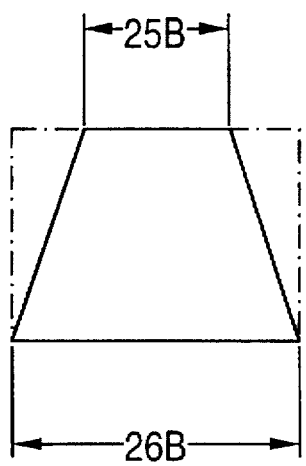

FIG. 15 is a view for illustrating a pre-compensated picture signal when the projection lens is arranged as shown in FIG. 5. Hereinafter, a description concerning Embodiment 1 will be provided with reference to a timing diagram in FIG. 8, and a description concerning Embodiment 2 will be given with reference to another timing diagram of FIG. 11. As shown in FIG. 5, when projection lens 11 of projector 10 is arranged with a downward projection angle with respect to screen 20, projection angle setting signal 101 from projection angle setting section 100 is applied to controlling section 200. In response to projection angle setting signal 101, controlling section 200 controls the process for pre-compensating picture signal data PSD in order to project a normal picture (see FIG. 2) onto screen 20. As shown in FIG. 6, the picture projected onto screen 20 has the shape of a trapezoid in which width 25B of the upper end is smaller than width 26B of the lower end. Therefore, controlling section 200 controls the process for pre-compensating picture signal data PSD in order to form, in the shape of a reverse trapezoid, the picture which will be projected onto screen 20 (see FIG. 15). Namely, controlling section 200 applies record control signal 204 to control clock generating section 300 so that in response to main clock signal M.CLK, control clock generating section 300 can output write clock signal 301, whose frequency is adjusted in the compensation direction for the downward projection angle (the direction of the arrow shown in FIG. 15).

In response to record control signal 204, control clock generating section 300 outputs write clock signal 301 for executing the process in which the pixels of picture signal data PSD are deleted in the compensation direction when picture signal data PSD is provided in units of a scanning line to memory section 500 in response to horizontal synchronizing signal H.SYNC. Namely, at a leading edge of main clock signal M.CLK, control clock generating section 300 outputs write clock signal 301 for recording picture signal data PSD. When first switching control signal 201 from controlling section 200 is applied to first switching section 400, write clock signal 301 is applied to memory section 500 via first switching section 400.

In response to switched write clock signal 401 from first switching section 400, memory section 500 records deletion-processed picture signal data PSD while deleting the pixels of picture signal data PSD in units of a scanning line, in order to produce a picture having a shape reverse to the shape of the picture which is to be projected onto screen 20 (see FIG. 6). When a normal frequency of read clock signal 302 generated at a leading edge of main clock signal M.CLK is applied to memory section 500 with a predetermined time delay, i.e., 2*TD1 in Embodiment 1 or (TD2+TD3) in Embodiment 2 under the control operation of controlling section 200, picture signal data PSD recorded in memory section 500 is read out with a predetermined time delay, i.e., TD1 in Embodiment 1 or TD3 in Embodiment 2. Controlling section 200 applies second switching control signal 202 to second switching section 600. Then, blanking data BD supplied from outside to second switching section 600 for a predetermined time interval, i.e., 2*TD1 in Embodiment 1 or (TD2+TD3) in Embodiment 2, is provided from second switching section 600 in order to generate a pre-compensated picture (see FIG. 15). Also, control section 200 controls memory section 500 to output read picture signal data 501 for a duration of an effective picture signal. When the duration of an effective picture signal is completed, controlling section 200 controls second switching section 600, and the switching operation of second switching section 600 provides blanking data BD for a predetermined time interval, i.e., TD1 in Embodiment 1 or TD3 in Embodiment 2.

Thus, both switched picture signal data 601 and switched blanking data 602 are provided from second switching section 600 to data converting section 800. When controlling section 200 applies third switching control signal 203 to third switching section 700, data conversion output signal 303, which has a predetermined time delay, i.e., TD1 in Embodiment 1 or TD3 in Embodiment 2, is supplied from control clock generating section 300 to data converting section 800 via third switching section 700. Then, data converting section 800 converts switched picture signal data 601, which has switched blanking data 602 added therein, i.e., picture signal data PSD which has blanking data BD added therein, and data converting section 800 applies converted picture signal data 801, i.e., pre-compensated picture signal, to projector 10. Consequently, even when projection lens 11 of projector 10 is arranged at a downward projection angle with respect to screen 20 (see FIG. 5), a pre-compensated picture signal (see FIG. 15) is projected onto screen 20 via projection lens 11, so a normal picture (see FIG. 2) is formed on screen 20. Namely, in contrast to the asymmetrical picture (see FIG. 6) which occurs when the picture signal is not pre-compensated, a normal picture is projected onto screen 20.

In the method for pre-compensating an asymmetrical picture in a projector, when the projection lens of the projector is arranged at an upward or a downward projection angle, regardless of the projection angle, the trapezoidal error of the picture projected onto the screen is pre-compensated in response to the projection angle setting signal from the projection angle setting section. Namely, the picture is normally projected onto the screen (e.g., a picture in the shape of a rectangle).

As a result, firstly, because the keystoning is prevented, the picture projected onto the screen will never irritate a user. Secondly, the arrangement of the projector with respect to the screen is very flexible. Thirdly, when pre-compensating the trapezoidal error of an asymmetrical picture, the performance and the structural flexibility of the hardware in the projector are enhanced by using digital circuits and computer software. Therefore, the conventional construction and/or operation of a projector does not need to be altered.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for pre-compensating an asymmetrical picture in a projection system for displaying a picture, said method comprising the steps of:

(i) inputting a key data corresponding to a projection angle setting signal when a central axis of a projection lens installed in a projector for projecting a magnified picture onto a screen is arranged at an upward or downward projection angle with respect to the screen;

(ii) calculating on the basis of the key data inputted in step (i) parameters including a compensation direction, compensation amount(s) and a number of pixels to be deleted which are related to an operation for pre-compensating an asymmetry of a picture which is to be projected onto the screen;

(iii) generating a switched write clock signal having a pixel deletion time interval, at a leading edge of a main clock signal in accordance with the number of pixels to be deleted, calculated in step (ii);

(iv) recording a picture signal data with pixels deleted therefrom in units of a scanning line in the compensation direction determined in step (ii), in response to the switched write clock signal generated in step (iii), in order to generate a picture shaped in reverse to the picture to be projected onto the screen;

(v) generating a switched data conversion output signal at a leading edge of the main clock signal in order to have a time delay based on one of the parameters calculated in step (ii);

(vi) adding blanking data in the compensation direction determined in step (ii) to pixel-deleted parts of the read picture signal data in response to a second switching control signal in order to form picture signal data compensated in units of a scanning line; and (vii) converting the picture signal data having the blanking data added thereto and being formed in step (vi), into an analog signal in response to the switched data conversion output signal generated in step (v), and outputting a converted picture signal data.

2. The method for pre-compensating an asymmetrical picture in a projection system for displaying a picture as claimed in claim 1, wherein said switched data conversion output signal has a time delay corresponding to one half of a first compensation amount and beginning from a point in time of a leading edge of a horizontal digital signal process clock signal.

3. The method for pre-compensating an asymmetrical picture in a projection system for displaying a picture as claimed in claim 1, wherein said switched data conversion output signal has a time delay corresponding to one half of a second compensation amount and beginning from a point in time of a leading edge of a horizontal digital signal process clock signal.

4. The method for pre-compensating an asymmetrical picture in a projection system for displaying a picture as claimed in claim 1, wherein said switched read clock signal has the frequency of the main clock signal.

5. The method for pre-compensating an asymmetrical picture in a projection system for displaying a picture as claimed in claim 1, wherein said step (ii) comprises the substeps of:

(a) determining a compensation direction and calculating a first compensation amount on the basis of the key data inputted in step (i);

(b) calculating a total number of scanning lines of the picture;

(c) calculating a number of compensated blocks on the basis of the first compensation amount and the total number of scanning lines respectively calculated in steps (a) and (b); and (d) calculating a number of pixels to be deleted in units of a scanning line on the basis of the total number of scanning lines and the number of compensated blocks respectively calculated in steps (b) and (c).

6. The method for pre-compensating an asymmetrical picture in a projection system for displaying a picture as claimed in claim 5, wherein said compensation direction is an upward direction or a downward direction, and said number of compensated blocks is NB=(2×NS)/CA where the number of compensated blocks, the first compensation amount and the total number of scanning lines of the picture are respectively NB, CA and NS.

7. The method for pre-compensating an asymmetrical picture in a projection system for displaying a picture as claimed in claim 1, wherein said step (ii) comprises the substeps of:

(a) determining a compensation direction and calculating a second and third compensation amounts on the basis of the key data inputted in step (i); and (b) calculating a number of pixels to be deleted in units of a scanning line on the basis of the third compensation amount calculated in step (a).

8. The method for pre-compensating an asymmetrical picture in a projection system for displaying a picture as claimed in claim 7, wherein said compensation direction in an upward direction or a downward direction, and said second compensation amount is a maximum compensation amount.

9. The method for pre-compensating an asymmetrical picture in a projection system for displaying a picture as claimed in claim 1, wherein said step (vi) comprises the substeps of:

(k) receiving the blanking data in units of a scanning line by the switching operation, responsive to the second switching control signal, for the time interval corresponding to one half of a first compensation amount calculated in step (ii) prior to when the picture signal data having pixels deleted therefrom in units of a scanning line is read out;

(l) generating the switched read clock signal at a leading edge of the main clock signal in order to have the time delay based on the first compensation amount;

(m) reading out the picture signal data recorded in step (iv) in units of a scanning line in response to the switched read clock signal generated in step (l); and (n) receiving the blanking data by the switching operation, responsive to the second switching control signal, for the time interval corresponding to one half of the first compensation amount and beginning from a point in time when in step (m), reading out the recorded picture signal data in units of a scanning line has finished.

10. The method for pre-compensating an asymmetrical picture in a projection system for displaying a picture as claimed in claim 9, wherein said switched read clock signal has a time delay corresponding to the first compensation amount from a point in time of a leading edge of the normal horizontal digital signal process clock signal.

11. The method for pre-compensating an asymmetrical picture in a projection system for displaying a picture as claimed in claim 1, wherein said step (vi) comprises the substeps of:

(k) receiving the blanking data in units of a scanning line by the switching operation for the time interval corresponding to one half of the third compensation amount calculated in step (ii), prior to when the picture signal data having pixels deleted therefrom in units of a scanning line is read out;

(l) generating the switched read clock signal at a leading edge of the main clock signal in order to have the time delay based on the second and third compensation amounts calculated in step (ii);

(m) reading out the picture signal data recorded in step (iv) in units of a scanning line in response to the switched read clock signal generated in step (l); and (n) receiving the blanking data by the switching operation for the time interval corresponding to one half of the third compensation amount from a point in time when in step (m), reading out the recorded picture signal data in units of a scanning line has finished.

12. The method for pre-compensating an asymmetrical picture in a projection system for displaying a picture as claimed in claim 11, wherein said switched read clock signal has a time delay corresponding to one half of the sum of the second and third compensation amounts from a point in time of a leading edge of the normal horizontal digital signal process clock signal.

13. The method for pre-compensating an asymmetrical picture in a projection system for displaying a picture as claimed in claim 1, wherein said switched write clock signal has a pixel deletion time interval equal to A1 with respect to a reference leading edge of the main clock signal.

14. The method for pre-compensating an asymmetrical picture in a projection system for displaying a picture as claimed in claim 1, wherein said switched write clock signal has a pixel deletion time interval equal to A2 with respect to a reference leading edge of the main clock signal.

15. The method for pre-compensating an asymmetrical picture in a projection system for displaying a picture as claimed in claim 1, wherein said second switching control signal adds the blanking data to the pixel-deleted parts of the read picture signal data during a high level thereof.

16. The method for pre-compensating an asymmetrical picture in a projection system for displaying a picture as claimed in claim 15, wherein said second switching control signal includes high level pulses, each having the time interval corresponding to one half of the first compensation amount.

17. The method for pre-compensating an asymmetrical picture in a projection system for displaying a picture as claimed in claim 15, wherein said second switching control signal includes high level pulses, each having the time interval corresponding to one half of the third compensation amount.

18. A method for pre-compensating an asymmetrical picture in a projection system for displaying a picture, said method comprising the steps of:

(i) inputting a key data corresponding to a projection angle setting signal when a central axis of a projection lens installed in a projector for projecting a magnified picture onto a screen is arranged at an upward or downward projection angle with respect to the screen;

(ii) determining a compensation direction and calculating a first compensation amount on the basis of the key data inputted in step (i);

(iii) calculating a total number of scanning lines of the picture;

(iv) calculating a number of compensated blocks on the basis of the first compensation amount and the total number of scanning lines respectively calculated in steps (ii) and (iii);

(v) calculating a number of pixels to be deleted in units of a scanning line on the basis of the total number of scanning lines and the number of compensated blocks respectively calculated in steps (iii) and (iv);

(vi) generating a switched write clock signal having a pixel deletion time interval equal to A1 with respect to a reference leading edge of a main clock signal in accordance with the number of pixels to be deleted calculated in step (v);

(vii) recording picture signal data with pixels deleted therefrom in units of a scanning line in a compensation direction determined in step (ii) in response to the switched write clock signal generated in step (vi), in order to generate a picture shaped in reverse to the picture to be projected onto the screen;

(viii) generating a switched data conversion output signal at a leading edge of the main clock signal in order to have a time delay corresponding to one half of the first compensation amount calculated in step (ii);

(ix) receiving blanking data in units of a scanning line by the switching operation, responsive to a second switching control signal, for the time interval corresponding to one half of the first compensation amount, prior to when the picture signal data having pixels deleted therefrom in units of a scanning line is read out;

(x) generating the switched read clock signal at a leading edge of the main clock signal in order to have the time delay corresponding to the first compensation amount;

(xi) reading out the picture signal data recorded in step (vii) in units of a scanning line in response to the switched read clock signal generated in step (x);

(xii) receiving the blanking data by the switching operation, responsive to the second switching control signal, for the time interval corresponding to one half of the first compensation amount and beginning from a point in time when in step (xi), reading out the recorded picture signal data in units of a scanning line has finished; and (xiii) converting the picture signal data having the blanking data added thereto formed in steps (ix) and (xii) into an analog signal in response to the switched data conversion output signal generated in step (viii), and outputting a converted picture signal data.

19. The method for pre-compensating an asymmetrical picture in a projection system for displaying a picture as claimed in claim 18, wherein said switched read clock signal has the frequency of the main clock signal.

20. The method for pre-compensating an asymmetrical picture in a projection system for displaying a picture as claimed in claim 18, wherein said compensation direction is an upward direction or a downward direction, and said number of compensated blocks is NB=(2×NS)/CA, where the number of compensated blocks, the first compensation amount and the total number of scanning lines of the picture are respectively NB, CA and NS.

21. The method for pre-compensating an asymmetrical picture in a projection system for displaying a picture as claimed in claim 18, wherein said second switching control signal adds the blanking data to the pixel-deleted parts of the read picture signal data during a high level thereof.

22. The method for pre-compensating an asymmetrical picture in a projection system for displaying a picture as claimed in claim 18, wherein said second switching control signal includes high level pulses, each having the time interval corresponding to one half of the first compensation amount.

23. The method for pre-compensating an asymmetrical picture in a projection system for displaying a picture as claimed in claim 18, wherein said switched read clock signal has the time delay corresponding to first compensation amount and beginning from a point in time of a leading edge of a horizontal digital signal process clock signal.

24. A method for pre-compensating an asymmetrical picture in a projection system for displaying a picture, said method comprising the steps of:

(i) inputting a key data corresponding to a projection angle setting signal when a central axis of a projection lens installed in a projector for projecting a magnified picture onto a screen is arranged at an upward or downward projection angle with respect to the screen;

(ii) determining a compensation direction and calculating a second and third compensation amounts on the basis of the key data inputted in step (i);

(iii) calculating a number of pixels to be deleted in units of a scanning line on the basis of the third compensation amount calculated in step (ii);

(iv) generating a switched write clock signal having a pixel deletion time interval equal to A2 with respect to a reference leading edge of a main clock signal in accordance with the number of pixels to be deleted calculated in step (iii);

(v) recording picture signal data with pixels deleted therefrom in units of a scanning line in a compensation direction determined in step (ii) in response to the switched write clock signal generated in step (iv), in order to generate a picture shaped in reverse to the picture to be projected onto the screen;

(vi) generating a switched data conversion output signal at a leading edge of the main clock signal in order to have a time delay corresponding to one-half of the second compensation amount calculated in step (ii);

(vii) receiving blanking data in units of a scanning line by the switching operation, responsive to a second switching control signal, for the time interval corresponding to one half of the third compensation amount, prior to when the picture signal data having pixels deleted therefrom in units of a scanning line is read out;

(viii) generating the switched read clock signal at a leading edge of the main clock signal in order to have the time delay corresponding to one half of the sum of the second and third compensation amounts;

(ix) reading out the picture signal data recorded in step (v) in units of a scanning line in response to the switched read clock signal generated in step (viii);

(x) receiving the blanking data by the switching operation, responsive to the second switching control signal, for the time interval corresponding to one half of the third compensation amount and beginning from a point in time when in step (ix), reading out the recorded picture signal data in units of a scanning line has finished; and (xi) converting the picture signal data having the blanking data added thereto and being formed in steps (vii) to (x), into an analog signal in response to the switched data conversion output signal generated in step (vi) and outputting a converted picture signal data.

25. The method for pre-compensating an asymmetrical picture in a projection system for displaying a picture as claimed in claim 24, wherein said switched read clock signal has the frequency of the main clock signal.

26. The method for pre-compensating an asymmetrical picture in a projection system for displaying a picture as claimed in claim 24, wherein said compensation direction is an upward direction or a downward direction, and said second compensation amount is a maximum compensation amount.

27. The method for pre-compensating an asymmetrical picture in a projection system for displaying a picture as claimed in claim 24, wherein said second switching control signal adds the blanking data to be pixel-deleted parts of the read picture signal data during a high level thereof.

28. The method for pre-compensating an asymmetrical picture in a projection system for displaying a picture as claimed in claim 24, wherein said second switching control signal includes high level pulses, each having the time interval corresponding to one half of the third compensation amount.

29. The method for pre-compensating an asymmetrical picture in a projection system for displaying a picture as claimed in claim 24, wherein said switched read clock signal has the time delay corresponding to one half of the sum of the second and third compensation amounts and beginning from a point in time of a leading edge of a horizontal digital signal process clock signal.

* * * * *